United States Patent
Pan et al.

(10) Patent No.: US 11,485,886 B2
(45) Date of Patent: Nov. 1, 2022

(54) FORMALDEHYDE FREE ADHESIVE COMPOSITION

(71) Applicants: Dow Global Technologies LLC, Midland, MI (US); Dow Silicones Corporation, Midland, MI (US)

(72) Inventors: Shi Pan, Shanghai (CN); Minbiao Hu, Shanghai (CN); Tong Sun, Shanghai (CN); Xuemei Zhai, Shanghai (CN); Shaoguang Feng, Shanghai (CN); Yan Li, Shanghai (CN); Jingui Jiang, Shanghai (CN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/299,623

(22) PCT Filed: Mar. 7, 2019

(86) PCT No.: PCT/CN2019/077266
§ 371 (c)(1),
(2) Date: Jun. 3, 2021

(87) PCT Pub. No.: WO2020/177111
PCT Pub. Date: Sep. 10, 2020

(65) Prior Publication Data
US 2022/0017795 A1   Jan. 20, 2022

(51) Int. Cl.
| C09J 133/08 | (2006.01) |
| B32B 37/12 | (2006.01) |
| C09J 5/00 | (2006.01) |
| B32B 7/12 | (2006.01) |
| B32B 21/13 | (2006.01) |

(52) U.S. Cl.
CPC ............. *C09J 133/08* (2013.01); *B32B 7/12* (2013.01); *B32B 21/13* (2013.01); *B32B 37/12* (2013.01); *C09J 5/00* (2013.01); *C09J 2433/00* (2013.01)

(58) Field of Classification Search
CPC ........ C09J 133/08; C09J 5/00; C09J 2433/00; C09J 175/14; C09J 175/16; C09J 133/14; B32B 7/12; B32B 21/13; B32B 37/12; B27N 1/003; B27N 3/002; C08G 18/6245; C08G 18/73
See application file for complete search history.

(56) References Cited

U.S. PATENT DOCUMENTS

| 5,350,636 | A | 9/1994 | Huemke et al. |
| 5,726,242 | A * | 3/1998 | Kusuoka ............... C08G 18/44 524/839 |
| 6,632,873 | B2 | 10/2003 | Chen et al. |
| 7,064,165 | B2 | 6/2006 | Baumgart et al. |
| 8,399,090 | B2 | 3/2013 | Yano et al. |
| 8,551,615 | B2 | 10/2013 | Kishioka et al. |
| 8,828,548 | B2 | 9/2014 | Katsuhiro et al. |
| 8,883,922 | B2 | 11/2014 | Iseki et al. |
| 8,927,071 | B2 | 1/2015 | Shinya et al. |
| 10,138,401 | B2 | 11/2018 | Zhaohui et al. |
| 2007/0102108 | A1 | 5/2007 | Zheng et al. |
| 2009/0110849 | A1 | 4/2009 | Nishina |
| 2009/0162680 | A1 * | 6/2009 | Zheng ..................... B27D 1/04 156/182 |
| 2011/0165423 | A1 | 7/2011 | Ma et al. |
| 2013/0059960 | A1 | 3/2013 | Koso et al. |
| 2016/0251507 | A1 * | 9/2016 | Zhang .................. E01C 13/065 428/220 |
| 2016/0319081 | A1 * | 11/2016 | Kumar ................... C08G 77/08 |
| 2022/0017795 | A1 * | 1/2022 | Pan ........................... C09J 5/00 |

FOREIGN PATENT DOCUMENTS

| CN | 102031077 | 4/2011 |
| CN | 101760159 B | 12/2011 |
| CN | 102131880 B | 8/2014 |
| CN | 105612234 | 5/2016 |
| CN | 102985504 B | 9/2016 |
| CN | 106118554 | 11/2016 |
| EP | 29598 | 6/1981 |
| JP | 2009258499 | 11/2009 |
| JP | 05665700 B2 | 2/2015 |
| KR | 20160107646 | 9/2016 |
| WO | 2018062744 | 4/2018 |

OTHER PUBLICATIONS

Notice of First Office Action from corresponding Chinese Application No. 201980012652.8 dated Sep. 5, 2022.

* cited by examiner

*Primary Examiner* — Cynthia L Schaller
(74) *Attorney, Agent, or Firm* — Zhiqiang Zhao

(57) ABSTRACT

A formaldehyde free adhesive composition and a plywood obtained from the adhesive composition is provided, and the plywood has a balanced performance, such as high adhesion strength, sufficient pot-life, and good workability.

12 Claims, No Drawings

FORMALDEHYDE FREE ADHESIVE COMPOSITION

FIELD OF THE INVENTION

The present disclosure relates to an aqueous adhesive composition, in particular a formaldehyde free adhesive composition for plywood.

INTRODUCTION

Plywood is a sheet material manufactured from thin layers or "plies" of wood veneer that are glued together. It is an engineered wood from the family of wood-based panel which includes fiberboard and particle board (chipboard). Currently, artificial plywood is an important composite material with much wider application and much better performance than natural wood.

Adhesives are used to glue wood layers together to manufacture plywood. The majority of adhesives used for plywood are formaldehyde-based curing formulations, such as urea formaldehyde (UF) resin, and phenol formaldehyde (PF) resin. Urea formaldehyde (UF) and phenol formaldehyde (PF) take up over 90% total market share. Although several formaldehyde-free curing formulations (such as polyisocyanate based on diphenylmethane-diisocyanate (pMDI)) exist, they suffer from significant drawbacks as follows:

Short work window. Higher reactivity and fast curing speed result in short work window, i.e., the adhesive should be used up as soon as possible after being prepared. In certain cases, it would require additional investment on new equipment and working process redesign to accommodate such short work window.

High cost. Diphenylmethane diisocyanate (MDI) or hexamethylene diisocyanate (HDI) based polyisocyanate raw materials are more expensive than PF/UF-based adhesive packages.

Recently some biomaterial-based adhesive systems such as flour-based or soybean-based adhesives were reported to be used for plywood, but they usually show weakness in workability and water resistance.

Governmental regulations are pushing towards even lower allowable formaldehyde emission levels for the wood-based panel industry (E0<=0.5 mg/L vs. E1<=1.5 mg/L, in which E0 and E1 both refer to the formaldehyde emission standard in China), and the public is becoming more and more aware of health hazards posed by formaldehyde such as irritation, allergy and even cancer and malformation. As such environmental concerns keep bringing pressure to upgrade of adhesives for wood. As an even worse scenario, under floor heating is a growing market in China, and the best option for under floor heating is plywood floor, but to heat the plywood floor will accelerate the formaldehyde release speed and boost the risk.

Currently in US, there is a certification for no-added formaldehyde (NAF) product manufacturers by the California Air Resources Board (CARB). In China, an industry association standard of biomaterial-based composite panels and final products of no-added formaldehyde has been recently launched (T/CNFPIA 3002-2018).

Therefore, there is a strong need in the wood-based panel industry for alternative formaldehyde free adhesive compositions for plywood that have desirable performances such as adhesion performance and good workability.

SUMMARY OF THE INVENTION

The present disclosure provides a novel formaldehyde free adhesive composition for plywood that has desirable performances, such as long open time, good adhesion performance and good workability.

In a first aspect, the present disclosure provides a formaldehyde free adhesive composition comprising:
  (a) an aqueous emulsion of acrylic polymer; and
  (b) an aliphatic isocyanate crosslinker(s);
wherein said acrylic polymer has at least one structural unit of one or more ethylenically unsaturated monomers carrying at least one functional group, and said acrylic polymer has a glass transition temperature of −45° C. to 0° C.

In a second aspect, the present disclosure provides a method for producing a plywood, comprising:
  (a) providing a formaldehyde free adhesive composition according to this disclosure;
  (b) providing two or more layers of wood;
  (c) applying the formaldehyde free adhesive composition onto one or two surfaces of said two or more layers of wood;
  (d) stacking two or more layers of wood and pressing the stacked two or more layers of wood at room temperature; and
  (e) pressing the stacked two or more layers of wood at an elevated temperature of 50-200° C.

In a third aspect, the present disclosure provides a plywood obtained from a formaldehyde free adhesive composition according to the present disclosure.

DETAILED DESCRIPTION OF THE INVENTION

As disclosed herein, "and/or" means "and, or as an alternative". All ranges include endpoints unless otherwise indicated.

As disclosed herein, the term "composition", "formulation" or "mixture" refers to a physical blend of different components, which is obtained by mixing simply different components by a physical means.

As disclosed herein, the term "formaldehyde free" means that the composition has no added formaldehyde and/or no added formaldehyde generators.

As disclosed herein, the term "glass transition temperature" or "$T_g$" is determined by differential scanning calorimetry (DSC).

As disclosed herein, the term "alkyl" or "alkoxy" refers to an alkyl or alkoxy having 1 to 20 carbon atoms, preferably 1-10 carbon atoms, more preferably, 1-6 carbon atoms.

The use of the term "(meth)" followed by another term such as acrylate in the present invention, refers to acrylate, methacrylate and mixtures thereof.

"Acrylic" means (meth)acrylic acid, (meth)alkyl acrylate, (meth)acrylamide, (meth)acrylonitrile and modified forms thereof, such as (meth)hydroxyalkyl acrylate.

Adhesion strength of a multilayer structure refers to interlayer adhesion strength between any two adjacent layers of the multilayer structure.

The Aqueous Emulsion of Acrylic Polymer

The aqueous emulsion of acrylic polymer can be prepared through free radical emulsion or suspension addition polymerization or by dispersion of a pre-formed polymer under shear into an aqueous medium. Monomers suitable for the preparation of the acrylic polymer include, but are not limited to, (meth)acrylic acids and (meth)acrylates, such as alkyl (meth)acrylates. Examples of alkyl (meth)acrylates are, but not limited to, methyl acrylate, ethyl acrylate, butyl acrylate, glycidyl methacrylate, 2-ethylhexyl acrylate, methyl methacrylate, ethyl methacrylate, butyl methacrylate, and 2-ethylhexyl methacrylate, and combinations thereof.

The acrylic polymer in the present disclosure may comprise structural units of one or more ethylenically unsaturated monomers carrying at least one hetero functional group. The hetero functional group may be selected from the group consisting of ureido, nitrile, alkoxysilane (preferably hydrolyzable alkoxysilane), or phosphorous group. Preferably, the hetero functional group may be selected from the group consisting of ureido, and nitrile. Suitable ureido functional monomer includes, for example, ureido group containing (meth)acrylic acid alkyl esters. Examples of suitable ureido monomers are illustrated below:

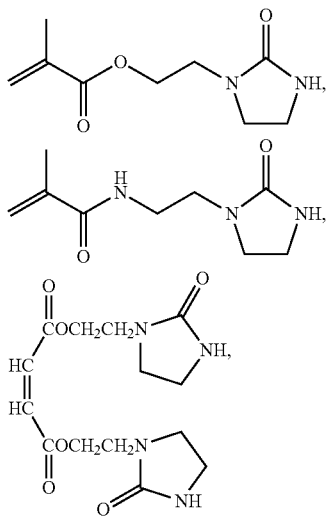

or mixtures thereof. Representative functional monomer like Norsocryl 104 can be obtained from Arkema. Suitable alkoxysilane functional monomer includes, for example, vinyltrialkoxysilanes such as vinyltrimethoxysilane; alkylvinyldialkoxysilanes; (meth)acryloxyalkyltrialkoxysilanes such as (meth)acryloxyethyltrimethoxysilane and (meth)acryloxypropyltrimethoxysilane; derivatives thereof, and combinations thereof. Preferred alkoxysilane functional monomer is Silquest A-171 available from Momentive. Suitable nitrile functional monomer includes, for example, (alkyl)acrylonitrile, such as (meth)acrylonitrile. Suitable phosphorous functional monomer includes, for example, phosphorous-containing (meth)acrylates, such as phosphoethyl (meth)acrylate, phosphopropyl (meth)acrylate, phosphobutyl (meth)acrylate, salts thereof, and mixtures thereof, $CH_2=C(R)-C(O)-O-(R_1O)_n-P(O)(OH)_2$, wherein R=H or $CH_3$, $R_1$=alkyl, and n=2-6, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof.

The acrylic polymer may comprise, based on the weight of the polymer, from 0.1% to 20% by weight, from 0.5% to 15% by weight, from 1% to 12% by weight, or from 2% to 10% by weight, of structural units of one or more ethylenically unsaturated monomers carrying at least one hetero functional group.

The acrylic polymer may further comprise structural units of one or more styrene monomers. The styrene monomers may include, for example, styrene, substituted styrene, or mixtures thereof. The substituted styrene may include, for example, benzyl acrylate, 2-phenoxyethyl acrylate, butylstyrene, methylstyrene, p-methoxystyrene, or mixtures thereof. Preferred styrene monomer is styrene. The polymer may comprise, by weight of the polymer, 1% or more, 5% or more, 10% or more, 15% or more, 17% or more, 19% or more, or even 21% or more, and at the same time, 40% or less, 35% or less, 30% or less, 28% or less, or even 26% or less, of structural unit(s) of the styrene monomer(s).

The acrylic polymer in the present disclosure is free of structural units of hydroxy-containing monomers.

In one embodiment, the aqueous emulsion of acrylic polymer is PRIMAL™ EC4642, PRIMAL™ EC4811, PRIMAL™ EC2848ER, PRIMAL™ AC 261P, available from the Dow Chemical Company.

The acrylic polymer in the present disclosure may have a weight average molecular weight of from 10,000 to 1,000,000, from 20,000 to 200,000, or from 40,000 to 150,000. The weight average molecular weight may be measured by gel permeation chromatography (GPC) calibrated by the polystyrene standard.

The acrylic polymer in the present disclosure has a glass transition temperature of −45° C. to 0° C., preferably, −40° C. to −10° C., more preferably −35° C. to −10° C. $T_g$ higher than 0° C. will not show enough initial adhesion while $T_g$ lower than −45° C. will not pass adhesion strength test. Nevertheless, other acrylic polymer emulsions outside this $T_g$ range can also work if mixed with acrylic polymer emulsion within this $T_g$ range.

The pH of the acrylic polymer in the present disclosure has a pH no higher than 9.

In the adhesive composition of the present disclosure, the aqueous emulsion of acrylic polymer comprises 5-99%, preferably, 10-60%, more preferably, 20-50% by weight of the composition, based on the solids of the composition.

The Aliphatic Isocyanate Crosslinker(s)

The aliphatic isocyanate cross-linker(s) is aliphatic hydrophilically modified cross-linker(s) with at least two isocyanate functionality. Preferably, the aliphatic hydrophilically modified cross-linker(s) with at least two isocyanate functionality is a hydrophilically modified HDI prepolymer, more preferably, the aliphatic isocyanate cross-linker(s) is hydrophilically modified hexamethylene diisocyanate trimer. Suitable examples of the aliphatic isocyanate cross-linker(s) include Bayhydur XP2487/1 from Covestro and Aquolin 270 from Wanhua Chemicals Co., Ltd.

In the adhesive composition of the present disclosure, the isocyanate crosslinker(s) comprises 0.5-20%, preferably, 1-15%, more preferably, 1-8%, more preferably, 3-7% by weight of the composition, based on the solids of the composition.

Rheology Modifiers

The adhesive composition according to the present disclosure may further comprise a rheology modifier. The rheology modifier may include, not limited to, a non-ionic urethane polymer, cellulose, cellulose ether, polyethylene glycol, starch ether, polyvinyl alcohol, polyimide, gum, flour and mixtures thereof. The rheology modifier was preferably chosen from non-associate thickener, such as cellulose ether.

The rheology modifier may be present, based on the total solid weight of the adhesive composition, in an amount of generally from 0.1 to 5.0% by weight, from 0.2% to 3% by weight, or from 0.5% to 2.0% by weight, or from 0.4% to 1.0% by weight.

Defoamer

The adhesive composition according to the present disclosure may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, NOPCO NXZ deformer available from NOPCO or mixtures thereof. The defoamer may be present, by weight of the total solid of the adhesive composition, in an amount of generally from 0.01 to 2%, from 0.02% to 1.5%, or from 0.04% to 0.5%, or from 0.04% to 0.1%.

Silane

For some applications, an adhesive composition having a high viscosity (e. g. >20,000 cP) and high solid content (e. g. >70%) is required. In these cases, to offer enough pot-life, loading of NCO cross-linker will be restricted, and silane was used as additive to compensate for NCO cross-linker, thus delivering both sufficient pot-life and adhesion performance. The silane according to the present disclosure may be epoxy-functional silane.

The epoxy functional silane compound useful in the present invention is typically a saturated alkoxylated silane having an epoxy group. The epoxy functional silane compound may have at least one hydrolysable silane group. A preferred epoxy functional silane compound has the general formula (I):

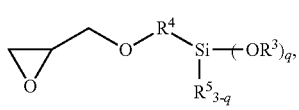

(I)

where each $R^3$ independently represents an alkyl group having one to 6 carbon atoms; each $OR^3$ group independently represents an alkoxy group having one to 6 carbon atoms including, for example, methoxy, ethoxy, or a combination thereof, $R^4$ represents a bivalent organic group having a molecular weight of 200 or less, preferably, $R^4$ is a $C_1$-$C_{10}$, $C_1$-$C_5$, or $C_1$-$C_3$ alkylene group; $R^5$ represents a hydrogen atom or an alkyl, aryl, or aralkyl group having one to 20 carbon atoms; and q is one, 2 or 3. Examples of suitable epoxy functional silane compounds include 3-glycidyloxypropyl trimethoxysilane, 3-glycidyloxypropyl triethoxysilane, 3-glycidyloxypropyl methyldiethoxysilane, 3-glycidyloxypropyl methyldimethoxysilane, or mixtures thereof. Commercially available epoxy functional silane compounds may include Silquest A-187 gamma-glycidoxypropyltrimethoxysilane from Momentive Performance Materials Inc.

The epoxy functional silanes useful in the present disclosure may be present in a combined amount of zero or more, 0.05% or more, 0.1% or more, 0.15% or more, 0.2% or more, 0.25% or more, 0.3% or more, or even 0.35% or more, and at the same time, 5% or less, 4% or less, 3% or less, 2.5% or less, 2% or less, 1.5% or less, 1.2% or less, 1% or less, 0.8% or less, or even 0.5% or less, by weight of the total solid of the adhesive composition.

Fillers

The adhesive composition according to the present disclosure may further comprise one or more fillers. The fillers may include, but not limited to, calcium carbonate, silica, silicate, gypsum, pulp, wood powder, flour powder and mixtures thereof, preferably $CaCO_3$. The filler may be present, by weight of the total solid of the adhesive composition, in an amount of generally from 0 to 75%, from 10% to 70%, or from 20% to 60%, or from 30 to 60%.

Other Additives

In addition to the components described above, the adhesive composition of the present invention may further comprise any one or combination of the following additives: dispersants, buffers, neutralizers, humectants, mildewcides, biocides, colorants, flowing agents, anti-oxidants, plasticizers, leveling agents, thixotropic agents, adhesion promoters, and grind vehicles. In one embodiment, the additive is selected from the group consisting of silane and dispersants. When present, these additives may be present in a combined amount of from 0 to 5% by weight or from 0.1% to 3% by weight, or from 0.5 to 1.5% by weight, based on the total solid weight of the adhesive composition.

The Adhesive Composition

The adhesive composition in the present disclosure is free of metal oxide cross-linkers, such as ZnO cross-linker.

The adhesive composition is aqueous, and is preferably organic solvent free, that is, the adhesive composition comprises less than 4%, preferably less than 2%, and more preferably less than 1%, or more preferably 0%, by dry weight based on total dry weight of the adhesive composition, an organic solvent.

The organic solvent is a compound that is a liquid at 25° C., and has a boiling point of below 300° C.

Examples

Some embodiments of the invention will now be described in the following Examples, wherein all parts and percentages are by weight unless otherwise specified.

I. Raw Materials

TABLE 1

Raw materials

| Ingredients | Trade name | Supplier |
| --- | --- | --- |
| Acrylic polymer emulsion | PRIMAL ™ EC4811 (53% solids by weight, $T_g$ = −18.8° C.) PRIMAL ™ EC2848ER (61% solids by weight, $T_g$ = −31.1° C.) PRIMAL ™ EC2540 (55% solids by weight, $T_g$ = −7.4° C.) TIANBA ™ 2012 (56% solids by weight, $T_g$ = −10.5° C.) | The Dow Chemical Company |

TABLE 1-continued

Raw materials

| Ingredients | Trade name | Supplier |
|---|---|---|
| | ELASTENE ™ 2475 (48% solids by weight, $T_g$ = −12.1° C.) | |
| | ROBOND ™ PS-8200 (50% solids by weight, $T_g$ = −35.9° C.) | |
| Filler | Calcium carbonate | Changxing Qingsheng Calcium Industry Co., LTD |
| | Industry flour | Wujiang Junfa Chemical Co., LTD |
| | Wood powder | Linyi Senxin Wood Products |
| Isocyanate cross-linker | Bayhydur ® XP 2487/1 | Covestro |
| | PAPI ™ 27 | The Dow Chemical Company |
| Rheology Modifier | WALOCEL ™ MW40000PFV | The Dow Chemical Company |
| Defoamer | NOPCO NXZ | SAN NOPCO |
| Dispersant | OROTAN ™ CA-2500 | The Dow Chemical Company |

TABLE 2

Functional Monomers

| Acrylic Latex | Solid Content | pH | Hetero Functional Group(s) Present | $T_g$ (° C.) |
|---|---|---|---|---|
| PRIMAL ™ EC2540 | 55% | 9.5 | No | −7.4 |
| PRIMAL ™ EC4811 | 53% | 8.0 | Yes | −18.8 |
| PRIMAL ™ EC2848ER | 61% | 7.5 | Yes | −31.1 |
| TIANBA ™ 2012 | 56% | 4.8-7.0 | No | −10.5 |
| ELASTENE ™ 2475 | 48% | 8.5 | No | −12.1 |
| ROBOND ™ PS-8200 | 50% | 9 | No | −35.9 |

II. Test Methods

Glass Transition Temperature Measurements 10 grams of emulsion were placed in a plastic dish and allowed to dry for 24 hours at room temperature. The resultant film was then subjected to 50° C. for 48 hours to further dry the film. A small piece of the film was cut off and placed in a TA Instruments standard aluminum hermetic pan which was sealed. The sample was subjected to two cycles of −60° C. to 100° C. at a heating ramp rate of 10° C./min. The glass transition temperature for the polymer is measured at the midpoint of the inflection using the half-height method.

Wood adhesive performance evaluations are carried out according to China national standard (GB17657-2013):

1) The plywood sample was cut into test samples of a standard shape (cross-section of the testing area is approximately 25 mm*25 mm, square). The grain direction of the tested wood layer should be perpendicular to the long side.

2) The test samples were immerged into boiling water for 4 hours, followed by a drying procedure in oven at (60±3)° C. for 16-20 hours.

3) The test samples were then immerged into in boiling water for additional 4 hours, and then immerged into cold water with temperature no higher than 30° C. for at least 1 hour.

4) The both ends of the test samples were fixed on universal mechanical testing machine, with gradually increased force applied. The maximum forces at the breaking point were recorded as $P_{max}$.

5) The adhesion strength was calculated as in formula: $X_A = P_{max}/(b*l)$, wherein $X_A$=sample adhesion strength (MPa), $P_{max}$=the maximum force at the sample breaking point (N), b and l were the sample parameters, b is about 25 mm, l is about 25 mm. If the calculated $X_A$ was no lower than 0.7 MPa, the sample passed adhesion strength test.

Pot-Life Evaluation Method

Pot-life reflects the viscosity stability of wood binder, which is very important for the application for wood adhesive. Due to the highly reactive nature of isocyanate, the pot-life will strongly impact the feasibility of binder formulations. The evaluation procedures are listed as follows:

1) Prepare the full formulation of wood binder;

2) Test the viscosity right away by Brookfield Viscometer at 25° C., using spindle 63 #, 64 # or 65 #, and the original viscosity was recorded as V0 (cP);

3) Store the wood binder at 25° C. with sealed lid. Test the viscosity at $1^{st}$, $2^{nd}$, $3^{rd}$ and $4^{th}$ hour using the same spindle and rotation speed as V0, and recorded as Vn (n=1, 2, 3 and 4) (cP);

4) When Vn exceeds 150%*V0, then the pot-life ($T_p$) will be n−1<$T_p$<n. If the viscosity was stable and even V4 did not exceed 150%*V0, the pot-life will be $T_p$>4 hours.

III. Examples

I) Preparation of the Adhesive Compositions of CE1-7 and IE1-3

Adhesive compositions of CE1-7 and IE1-3 were prepared according to the followings preparation procedures:

1. A mixture of acrylic aqueous emulsion, isocyanate cross-linker, dispersant (if any), half amount of the defoamer (if any), silane additive (if any) and water (if any) were dispersed for 15 min by high speed mixture at 900 rpm.

2. Inside the mixture, fillers (if any) and rheology modifier (if any) were added while stirring, and the dispersing process was continued for additional 15 min by high speed mixture at 1500 rpm. The other half amount of the defoamer was added in this procedure.

3. The adhesive composition was ready to use.

II) Plywood Board Sample Preparation Procedures:

1. The prepared adhesive compositions of CE-1 to CE-7 were immediately used, and IE-1 to IE-3 was stored for 1 hour before application.

2. The adhesive was then applied on wood rotary veneers (30 cm*30 cm*2.6 mm). The loading was 250 g/m² for one side.

3. The rotary veneers applied with adhesives were left for another 2 hours, except for those coated with CE-5 that was directly assembled and pressed.

4. Five veneers were then assembled by layered stacking with the grains of conjoint veneer dyads perpendicular to each other.

5. The assembly of veneers will then pressed by vulcanizer with around 1 MPa pressure at room temperature for 40 min.

6. The assembly will then be pressed under around 1 MPa again at 110° C. for 15 min.

7. The engineered wood floor samples were left for 24 hours at room temperature.

IV. Results

TABLE 3

Performance summary for basic formulations (comparative examples)

| | Composition (g) | CE-1 | CE-2 | CE-3 | CE-4 | CE-5 | CE-6 | CE-7 |
|---|---|---|---|---|---|---|---|---|
| Acrylic Aqueous Emulsion | PRIMAL ™ EC2540 | — | — | — | — | — | 100 (50.1%) | — |
| | PRIMAL ™ EC4811 | 100 (100%) | — | — | — | — | — | — |
| | PRIMAL ™ EC2848ER | — | — | — | — | 100 (54.6%) | — | 100 (52.7%) |
| | TIANBA ™ 2012 | — | 100 (50.6%) | — | — | — | — | — |
| | ELASTENE ™ 2475 | — | — | 100 (47.0%) | — | — | — | — |
| | ROBOND ™ PS-8200 | — | — | — | 100 (48%) | — | — | — |
| Isocyanate cross-linker | Bayhydur ® XP 2487/1 | — | 4 (3.6%) | 4 (3.9%) | 4 (3.8%) | 4 (3.6%) | 4 (3.6%) | — |
| | PAPI ™ 27 | — | — | — | — | — | — | 4 (3.5%) |
| Filler | CaCO₃ | — | 44 (39.7%) | 44 (42.6%) | 44 (41.8%) | — | 44 (40.1%) | 44 (38.0%) |
| | Industry flour | — | — | — | — | 40 (35.8%) | — | — |
| | Wood Powder | — | 6 (5.4%) | 6 (5.8%) | 6 (5.7%) | 6 (5.4%) | 6 (5.5%) | 6 (5.2%) |
| Dispersant | OROTAN ™ CA-2500 | — | 0.6 (0.14%) | 0.6 (0.15%) | 0.6 (0.15%) | 0.6 (0.14%) | 0.6 (0.14%) | 0.6 (0.14%) |
| Defoamer | NOPCO NXZ | — | 0.06 (0.05%) | 0.06 (0.06%) | 0.06 (0.06%) | 0.06 (0.05%) | 0.06 (0.05%) | 0.06 (0.05%) |
| Rheology Modifier | WALOCEL ™ MW40000PFV | — | 0.5 (0.45%) | 0.5 (0.48%) | 0.5 (0.48%) | 0.5 (0.45%) | 0.5 (0.46%) | 0.5 (0.43%) |
| Water | Water | — | 43 (0%) | 43 (0%) | 43 (0%) | 47 (0%) | 43 (0%) | 43 (0%) |

Note:
1. CE = Comparative example, IE = Inventive example.
2. The percentages within the parentheses are the solid content of the component based on the total solid weight of the adhesive composition.

TABLE 4

Performance summary for basic formulations (inventive examples)

| | Composition (g) | IE-1 | IE-2 | IE-3 |
|---|---|---|---|---|
| Acrylic polymer emulsion | PRIMAL ™ EC4811 | 100 (49.2%) | — | — |
| | PRIMAL ™ EC2848ER | — | 100 (52.7%) | 100 (93.8%) |
| Isocyanate cross-linker | Bayhydur ® XP 2487/1 | 4 (3.7%) | 4 (3.5%) | 4 (6.2%) |
| Filler | CaCO₃ | 44 (40.8%) | 44 (38.0%) | — |
| | Wood Powder | 6 (5.6%) | 6 (5.2%) | — |
| Dispersant | OROTAN ™ CA-2500 | 0.6 (0.15%) | 0.6 (0.14%) | — |
| Defoamer | NOPCO NXZ | 0.06 (0.06%) | 0.06 (0.05%) | — |
| Rheology Modifier | WALOCEL ™ MW40000PFV | 0.5 (0.46%) | 0.5 (0.43%) | — |
| Water | Water | 43 (0%) | 43 (0%) | — |

The results in the following Table 5 gives the detailed adhesion strength data of four samples for example formulations.

TABLE 5

Adhesion strength data for example formulations

| Entry No. | Adhesion strength (MPa) | | | | Evaluation |
|---|---|---|---|---|---|
| | 1 | 2 | 3 | 4 | |
| CE-1 | 0 | 0 | 0 | 0 | Fail |
| CE-2 | 0 | 0 | 0 | 0 | Fail |
| CE-3 | 0 | 0 | 0 | 0 | Fail |
| CE-4 | 0 | 0.52 | 0.44 | 0.40 | Fail |
| CE-5 | 0 | 0 | 0 | 0 | Fail |
| IE-1 | 1.09 | WB | 0.74 | 1.12 | Pass |
| IE-2 | 0.80 | 0.89 | 0.99 | 0.78 | Pass |
| IE-3 | 1.04 | WB | WB | 1.13 | Pass |

The result in the following Table 6 gives the pot-life data for CE6-7 and IE1-3.

TABLE 6

Pot-life data for example formulations

| Entry | CE-6 | CE-7 | IE-1 | IE-2 | IE-3 |
|---|---|---|---|---|---|
| Pot-Life (hour) | <1 | <1 | >4 | >4 | >4 |
| Evaluation | Fail | Fail | Pass | Pass | Pass |

Compared with traditional formaldehyde based adhesives, our disclosure is a formaldehyde-free package with comparable adhesion performance proved by experimental data. Furthermore, compared with existing formaldehyde-free techniques, our disclosure is a systematic package that deliver good adaptability to common manufacturing line and application methods (referred to as "workability" in the following content), which was originally designed for formaldehyde adhesives. These competencies were not covered in existing patents, including good water resistance and high adhesion strength, sufficient pot-life, good workability and the initial adhesion after room temperature pressing that was required in manufacturing cycles.

As demonstrated in Table 5, pure acrylic emulsion did not pass adhesion strength test (CE-1), and acrylic polymer with relatively higher $T_g$ did not pass either (CE-2 which contains TIANBA™ 2012). If industrial flour was largely adopted as filler, the pot-life would be short and the performance would also be poor (CE-5).

Acrylic polymer with fit $T_g$ can contribute to good performance in adhesion strength (IE-1 to IE-3). However, in IE-1 to IE-3, the acrylic polymer (EC4811 and EC2848ER) possess hetero-functional group on the polymer backbone. If they were replaced by acrylic polymer without hetero-functional groups (TIANBA™ 2012, ELASTENE™ 2475 and ROBOND™ PS-8200) as in CE-2 to CE-4, although the $T_g$ were similar, CE-2 to CE-4 could not pass adhesion strength test. IE-3 verified that a simple mixture of an aqueous acrylic emulsion (PRIMAL™ EC2848ER) and an isocyanate cross-linker could also work for a plywood.

Pot-life control is important for isocyanate to be adopted in wood adhesives. The pot-life will be influenced by pH of acrylic polymer emulsion, as higher pH will accelerate the reaction of isocyanate. As shown in Table 6, the adoption of PRIMAL™ EC2540 with pH>9 resulted in poor pot-life (CE-6). The pH of PRIMAL™ EC4811 and PRIMAL™ EC2848ER were both lower than 9, which contributed to a good pot-life performance (IE-1 to IE-3). Due to the highly reactive nature, aromatic isocyanates were not suitable for wood adhesive application. Therefore, PAPI 27 (pMDI, polymeric diphenylmethane diisocyanate) will also result in quick failure in pot-life (CE-7), while aliphatic isocyanate with milder reaction speed will help to achieve good pot-life performance (IE-Ito IE-3).

The water based formaldehyde free wood binder in this disclosure was developed with a water-dispersible isocyanate cross-linker, acrylate based polymer emulsion, and other ingredients such as fillers. Compared with existing formaldehyde based binders (PF or UF), the adhesive composition of the present disclosure possesses the advantages of no formaldehyde ingredients, no formaldehyde releasing, low curing temperature (100-120° C.), short curing time (1 min for 1 mm of wood board), long pot-life (>4 hours, refers to the period between binder preparation and application on wood) and comparable performance in adhesion performance test.

What is claimed is:

1. A formaldehyde free adhesive composition comprising:
   (a) an aqueous emulsion of acrylic polymer; and
   (b) one or more aliphatic isocyanate crosslinkers;
   wherein said acrylic polymer has at least one structural unit of one or more ethylenically unsaturated monomers carrying at least one hetero functional group, and said acrylic polymer has a glass transition temperature of −45° C. to 0° C.; and
   wherein the adhesive composition has a pot-life of >4 hours.

2. The adhesive composition according to claim 1, wherein the hetero functional group is selected from the group consisting of ureido, nitrile, alkoxysilane, and phosphorous groups.

3. The adhesive composition according to claim 1, wherein the acrylic polymer has a glass transition temperature of −40° C. to −10° C.

4. The adhesive composition according to claim 1, wherein the acrylic polymer is free of structural unit of hydroxy-containing monomers.

5. The adhesive composition according to claim 1, wherein the aqueous emulsion of acrylic polymer has a pH no higher than 9.

6. The adhesive composition according to claim 1, further comprising one or more additives selected from the group of fillers, rheology modifiers, and defoamers.

7. he adhesive composition according to claim 1, further comprising silanes.

8. The adhesive composition according to claim 1, wherein the aliphatic isocyanate cross-linker is a hydrophilically modified HDI prepolymer.

9. A method for producing a plywood, comprising:
   (a) providing a formaldehyde free adhesive composition according to claim 1;
   (b) providing two or more layers of wood;
   (c) applying the formaldehyde free adhesive composition onto one or two surfaces of said two or more layers of wood;
   (d) stacking two or more layers of wood and pressing the stacked two or more layers of wood at room temperature; and
   (e) pressing the stacked two or more layers of wood at an elevated temperature of 50-200 ° C.

10. The method according to claim 9, wherein the plywood obtained by the above method comprises 3-11 layers of wood.

11. A plywood obtained by a formaldehyde free adhesive composition according to claim 1.

12. The adhesive composition of claim 1, wherein the adhesive composition has an adhesive strength of greater than 0.7 MPa.

\* \* \* \* \*